(12) United States Patent
Chang et al.

(10) Patent No.: US 8,305,898 B2
(45) Date of Patent: Nov. 6, 2012

(54) SYSTEM AND METHOD FOR GUIDING AND DISTRIBUTING NETWORK LOAD FLOW

(75) Inventors: Ching-Keu Chang, Taipei (TW); Wei-Chen Liu, Taipei (TW); Ming-Ho Wu, Taipei (TW); Ming-Shan Shyu, Taipei (TW); Feng-Peng You, Taipei (TW)

(73) Assignee: Chunghwa Telecom Co., Ltd., Taipei (TW)

( * ) Notice: Subject to any disclaimer, the term of this patent is extended or adjusted under 35 U.S.C. 154(b) by 0 days.

(21) Appl. No.: 12/815,164

(22) Filed: Jun. 14, 2010

(65) Prior Publication Data

US 2011/0158097 A1    Jun. 30, 2011

(30) Foreign Application Priority Data

Dec. 31, 2009   (TW) .............................. 98146219 A (51) Int. Cl.
*G01R 31/08* (2006.01)

(52) U.S. Cl. ........................................ 370/235; 709/219

(58) Field of Classification Search .................. 370/235; 709/219

See application file for complete search history.

(56) References Cited

U.S. PATENT DOCUMENTS

| | | | |
|---|---|---|---|
| 2002/0174010 A1* | 11/2002 | Rice, III | 705/14 |
| 2003/0110262 A1* | 6/2003 | Hasan et al. | 709/226 |
| 2004/0215746 A1* | 10/2004 | McCanne et al. | 709/219 |
| 2008/0049753 A1* | 2/2008 | Heinze et al. | 370/392 |
| 2009/0040981 A1* | 2/2009 | Agashe et al. | 370/331 |

* cited by examiner

*Primary Examiner* — Robert Wilson
*Assistant Examiner* — Wei Zhao (57) ABSTRACT

A system and method for guiding and distributing network load flow is proposed and characterized by providing service-providing equipment with better packet routes to reduce the load flow of a routing device. At least two service-providing devices are connected to enable the routing device to guide the packets sent by a user-end device into the at least two connected service-providing devices for allowing the service provider used by the user to process requested services and thereby reduce the number of times of sending data packets to the routing device. In the case that the subscriber has applied for multiple network services, the packets only need to be requested once with the connected service-providing equipment in order to complete all network services.

18 Claims, 5 Drawing Sheets

SYSTEM AND METHOD FOR GUIDING AND DISTRIBUTING NETWORK LOAD FLOW

BACKGROUND OF THE INVENTION

1. Field of the Invention

This invention relates to systems and methods for guiding and distributing network load flows, and more particularly, to a system and method for guiding and distributing network load flow, the system and method using a connection structure of network service equipment to integrate processing equipment having various load flows to reduce the load flow of the routing devices.

2. Description of Related Art

Various network services or applications exist. Common network applications include browsing network pages, shopping on-line and sending or receiving e-mails. Additionally, various network services, such as anti-virus protection, mail services or page filtering, are provided to the market. In general, users connect to the Internet via Internet Service Providers (ISPs). Accordingly, many Internet Service Providers provide various additional network services.

Figure 1:
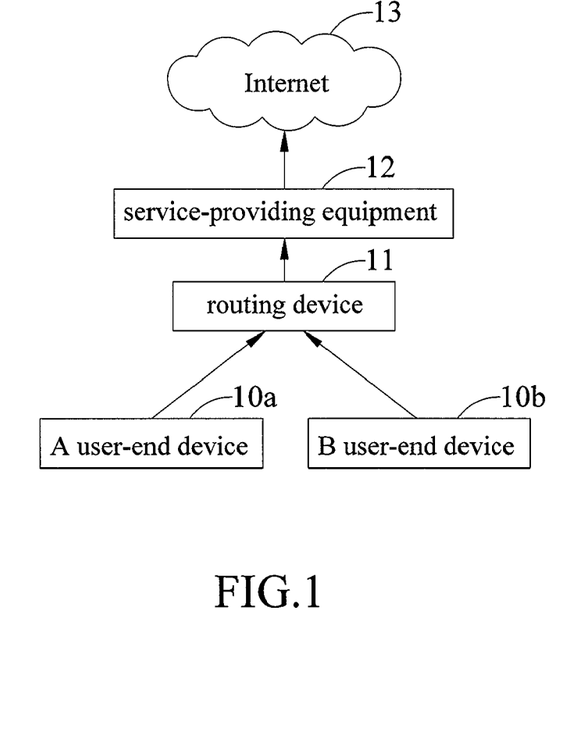
FIG. 1 is a functional block diagram of a system for transmitting packets with network service equipment according to the prior art.

FIG. 1 is a functional block diagram of an IP-based network packet transmission system according to the prior art. When connected to the Internet 13, user-end devices 10a and 10b are both connected via a routing device 11 to a service-providing device 12 first, and then the service-providing device 12 analyzes packets transmitted by users, provides certain kinds of services, such as protective services, and transmits the packets to Internet 13. Such a packet transferring mechanism cannot determine and generate route guidance according to characteristics of the packets. Moreover, all of the user-end device packets in-and-out have to pass through the service-providing device 12, and then the service-providing device 12 determines whether to provide services to the user-end device, which results in a heavy load on the service-providing device 12.

Figure 2:
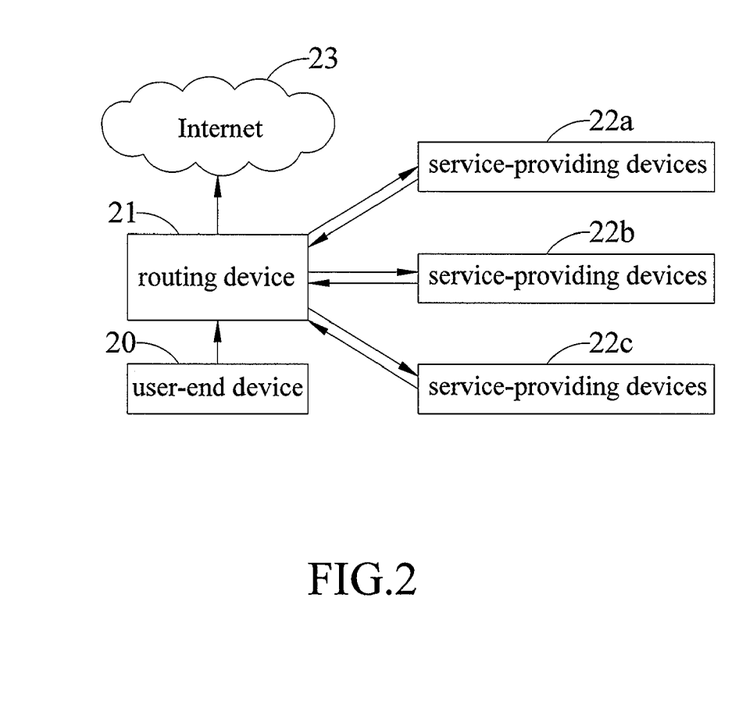
FIG. 2 is a functional block diagram of another system for transmitting packets with network service equipment according to the prior art.

FIG. 2 shows another packet flow distribution and guidance arrangement. A user-end device 20 is connected to a routing device 21 first, wherein the routing device 21 determines packet routes for the transmitted packets. If a packet needs services provided by one of the service-providing devices 22a-22c, the packet will be guided to the corresponding service-providing device. If the packet does not need network services or the network services are completed, the packet is guided to Internet 23. However, the above mechanism, though reducing the load on the service-providing devices 22a-22c, shifts the load to the routing device 21. For instance, when a packet needs to perform three network services, the routing device 21 has to transfer the packet three times, resulting in a heavy load on the routing device 21.

Some manufactures adopt a Multi-Protocol Label Switching (MPLS) Virtual Private Network (VPN) to provide packets with different tags, to identify the packets to be transmitted to certain service equipment devices. However, it does not provide any solution for processing various user service combinations with flow guidance. Moreover, in the past, when faced with different communications protocols that pass through various combinations of network service equipment devices, network service equipment devices and equipment that provide network guidance functions have to be established iteratively, to satisfy the service demands of various network types, which increases equipment and operational costs.

Therefore, developing a way to reduce the load on the routing device when network service packets are transmitted and provide better flow guidance and distribution to reduce the complexity of service setting of flow guidance and to reduce network delay is one of the most urgent needs in the art. Additionally, finding a way to make various types of network value-added service equipment operation patterns to be compatible in a single device, so as to integrate a plurality of operation patterns and reduce equipment costs, is another urgent need in the art.

SUMMARY OF THE INVENTION

In view of the above-mentioned problems, the present invention provides a system and method for guiding and distributing network load flow, whereby a routing device is provided with better network load flow guidance and distribution when transmitting packets, so as to avoid network delay caused by too heavy a load on the routing device.

The system for guiding and distributing network load flow includes: a user-end device; a routing device, for providing the user-end device with network connection routes; and service-providing equipment connected to the routing device and having at least two serially-connected service-providing devices, enabling a service-providing device belonging to a route set up by the routing device to provide user-subscribed-for services according to a serially-connected sequence of the serially-connected service-providing devices.

In another embodiment, the service-providing device of the system for guiding and distributing network load flow is divided into at least two sets of equipment that are connected via an inter-switch to the routing device in a parallel manner or in a cluster manner.

The method for guiding and distributing network load flow includes the following steps of: (1) serially connecting at least two service-providing devices; (2) enabling a user-end device connected to a network to transmit packets; (3) enabling a routing device connected to the user-end device to determine routes of the packets according to setup files of the user-end device; (4) enabling the routing device to guide the packets to the at least two serially-connected service-providing devices according to the routes, in order to let a service-providing device that provides the user-end device with applied services to complete the applied services for the packets according to a serially-connected sequence of the at least two service-providing devices; and (5) enabling the packets to return to the routing device in order for the routing device to transmit the packets to Internet.

Compared with the prior art, the system and its method for guiding and distributing network load flow of the present invention provide a user-end device, when transmitting packets, with better load guidance and distribution, so as to reduce the problems of network delay and too heavy a load on the routing device, without increasing the flow loads of the service-providing devices. With regard to different types of network service equipment, in the invention, only one routing device is required to process flow distribution, such that the problem that a plurality of sets of equipment that have the same structure needs to be established when operating in different operation patterns is avoided. Through the system structure and method of the present invention, the users may be provided with more elastic network services, and setting and the setting complexity of flow guidance are reduced, and network delay and operational costs may also be reduced, which contributes greatly to network service development.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The following illustrative embodiments are provided to illustrate the disclosure of the present invention, these and other advantages and effects being readily understood by those in the art after reading the disclosure of this specification. The present invention can also be performed or applied by different embodiments. The details of the specification may be changed in terms of the details and applications, and numerous modifications and variations can be devised without departing from the spirit of the present invention.

Figure 3A:
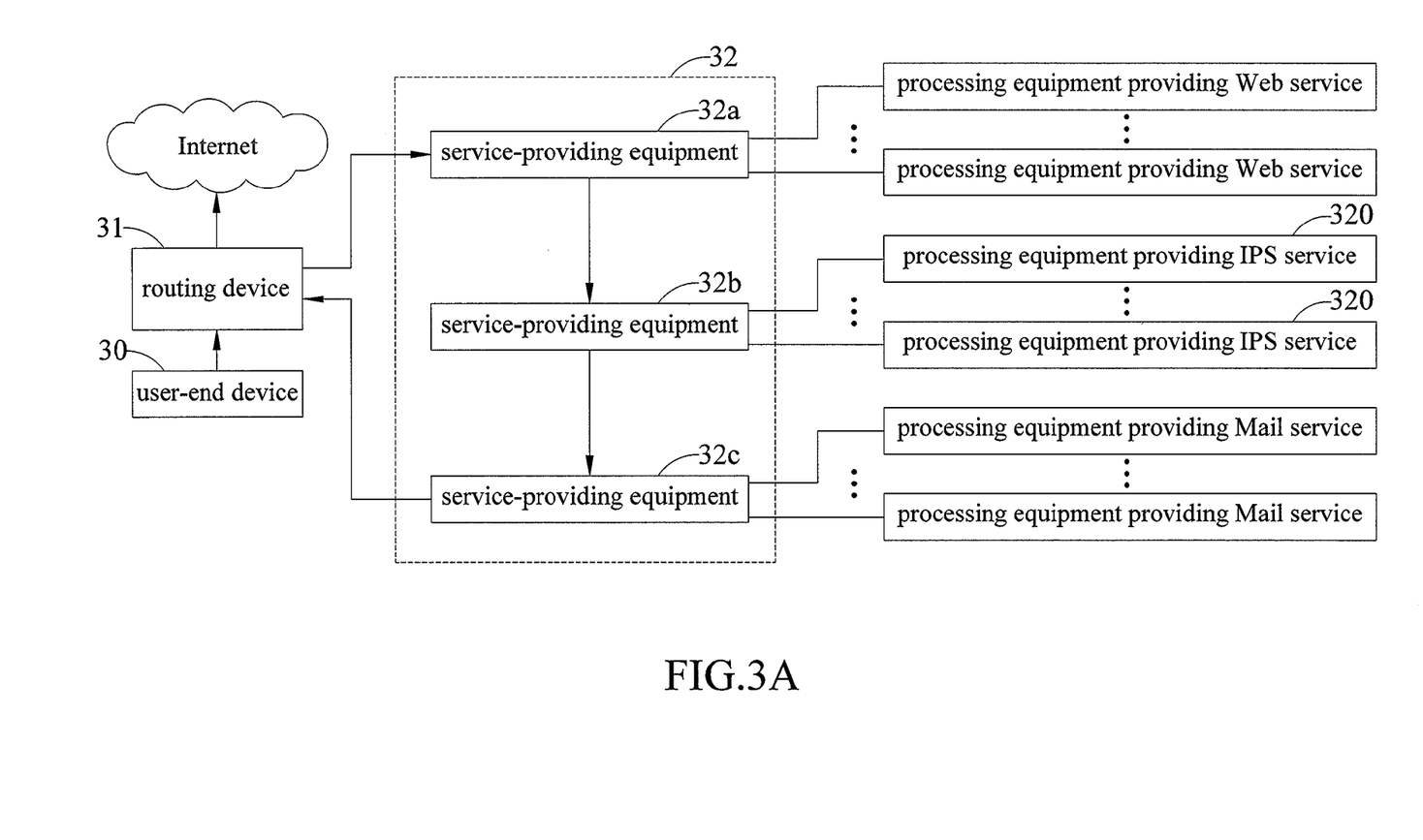
FIG. 3A is a functional block diagram of a system for guiding and distributing network load flow according to the present invention.

FIG. 3A shows a functional block diagram of a system for guiding and distributing network load flow according to the present invention. As shown in the figure, the system comprises: a user-end device 30, a routing device 31 and a service-providing equipment 32. The user-end device 30 refers to a device used by a user that utilizes network services, such as a server work station, desktop or laptop computer, network-accessible personal digital assistant or cellular phone. The routing device 31 is used for providing the user-end device 30 with routes of network connection. When packets are sent from the user-end device 30 to the routing device 31, the routing device 31 analyzes the contents contained in the packets to acquire characteristics of the packets, so as to determine routes along which the packets are transmitted subsequently. The service-providing equipment 32 is connected to the routing device 31, and includes at least two service-providing devices. The embodiment is described based on three service-providing devices 32a-32c, but is not limited thereto. The service-providing devices 32a-32c are serially connected, for providing the user-end device 30 with applied services. Simply speaking, as the routing device 31 is analyzing packets and performing network services, the packets are guided to the corresponding service-providing devices 32a-32c, wherein each of the service-providing devices 32a-32c then guide the packets to the connected processing equipment or transmit the packets to the next service-providing device directly according to setup files. Therefore, different users may select one or a combination of the service-providing devices 32a-32c to provide network services.

The so-called network services refer to additional services provided by Internet service providers for users to use on networks. In the embodiment, the service-providing devices may provide various network services, such as WEB services, Intrusion Prevention System (IPS) services and or MAIL services, including various value-added services, such as mail filtering, anti-virus function, virus scanning, abnormal packet checking, network surfing management and or network filtering. As shown in FIG. 3A, the service-providing devices 32a-32c are connected to processing equipment that provides different network services. In order to achieve flow load balancing, each of the service-providing devices 32a-32c is connected to a plurality of processing devices that provide the same services. For instance, the service-providing device 32b is connected to a plurality of processing devices 320 that provide IPS services. The service-providing device 32b distributes flow for the packets. The processing devices 320 that provide the IPS services process the packets. Note that network services provided by the service-providing devices are not limited to the aforesaid network services. Moreover, note that the embodiment shown in FIG. 3A does not limit the service sequence, service type or number of services provided by the service-providing devices. Moreover, the packets transmitted by the user-end device 30 may gain network services merely by the routing device 31, no matter what type of network (e.g., wide area network, virtual private network, local area network or wireless network) that the user-end device 30 uses to perform connection.

The routing device 31 determines routes along which the user-end device transmits packets according to setup files. The setup files may include Internet Protocol (IP), Remote Authentication Dial In User Service (RADIUS) and corresponding information of applied network services of the user-end device 30. Therefore, the routing device 31 enables the packets of the user-end device 30 to be transmitted to the corresponding service-providing devices 32a-32c according to information stored in the setup files.

The system for guiding and distributing network load flow of the present invention is also different from a conventional network service structure. With regard to different types of value-added services, conventional network services provide Proxy, Bridge and/or Mirror patterns, and have to prepare multiple sets of service-providing devices having the same structure to process different types of operation patterns. In the present invention, the at least two service-providing devices included in the service-providing equipment 32 may be connected to processing equipment, for processing network load flow in Proxy, Bridge and/or Mirror patterns guided by the service-providing equipment. The routing device 31 collects network flow that needs network services, and then distributes the collected network flow to corresponding service-providing devices. Therefore, the number of machines that provide services and the cost of equipment are reduced, or the setup complexity due to too many types of operation patterns may be avoided. The system for guiding and distributing network load flow of the embodiment further comprises a second-layer switch (Layer 2 switch) or a fourth-layer switch (Layer 4 switch), allowing the service-providing devices 32a-32c in the service-providing equipment 32 to be connected to the second-layer switch (Layer 2 switch) and/or the fourth-layer switch (Layer 4 switch), to provide flow load balance and high availability of fault tolerance mechanism.

Figure 3B:
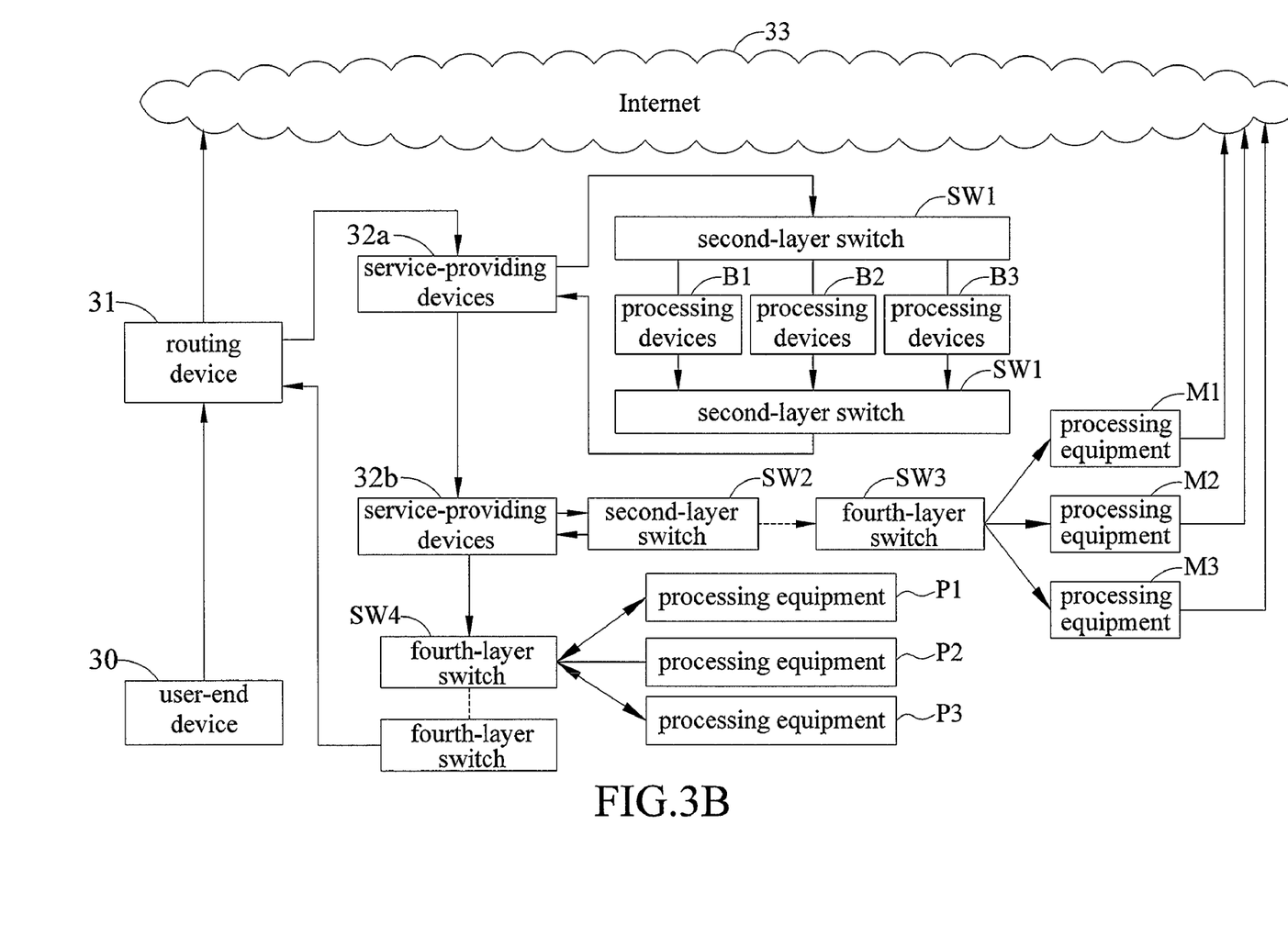
FIG. 3B is a functional block diagram of an embodiment of a system for guiding and distributing network load flow according to the present invention.

FIG. 3B is a functional block diagram of an embodiment of a system for guiding and distributing network load flow according to the present invention. As shown in the figure, the installation of service equipment of different types of the present invention are described. When packets are transmitted from the user-end device 30 to the routing device 31, the routing device 31 transmits flow packets that request services to the service-providing equipment. Three types are described as follows.

Service-providing device 32a is connected via a second-layer switch SW1 to processing devices B1, B2 and B3 in a Bridge pattern. The processing devices B1, B2 and B3 comprise processing equipment that provide the same services.

For example, the processing devices comprise network filtering equipment that may provide functions for checking or blocking passing packets, such as a firewall or IPS. The service-providing device 32a may distribute flow to any one of the processing devices B1, B2 and B3, to achieve load balancing. When any one of the processing devices B1, B2 and B3 is damaged, the service-providing device 32a may guide the flow to the remaining two healthy processing devices, to achieve load balancing and provide a fault-tolerance mechanism.

The service-providing device 32b is connected to rear-end processing devices M1, M2 and M3 in a Mirror pattern. The service-providing device 32b allows the flow to pass the second-layer switch SW2 first. The second-layer switch SW2 makes only one copy of the flow, and transmits the copy to the rear-end fourth-layer switch SW3. The fourth-layer switch SW4 distributes the flow to one of the processing devices M1, M2 and M3 which all provide the same services, to achieve load balancing and a fault-tolerance mechanism. The processing devices M1, M2 and M3 in charge of filtering flow packets are further connected to the Internet. Because the flow analyzed by the processing devices M1, M2 and M3 is obtained by the copying, when the processing devices M1, M2 and M3 analyze that the flow is abnormal, the processing devices B1, B2 and B3 are not allowed to interrupt the user connection in the equipment directly or discard the packets, as described previously. Therefore, the processing devices M1, M2 and M3 transmit via connection lines connected to the Internet 33 to request interrupting the connection, to interrupt the abnormal connection of the user-end device 30.

The Bridge pattern and the Mirror pattern have been described previously. How the system performs the Proxy pattern will be described as follows. As shown in FIG. 3B, processing devices P1, P2 and P3 that all provide the same services are common Proxy patterns. The integration of a system for guiding and distributing network load flow of the present invention with Proxy pattern processing equipment may save the installation of one service-processing device. Through the direct connection of other service-providing devices with a fourth-layer switch SW4, the fourth-layer switch SW4 may directly determine whether to guide user flow to the processing devices P1, P2 and P3. Of course, the current flow load balancing and fault-tolerance mechanism are still directed by the fourth-layer switch SW4.

The above describes that FIG. 3B is an embodiment of a system for guiding and distributing network load flow of the present invention. Its advantage is that it may provide packets transmitted by the user-end device 30 with multiple services with different arrangements, through the application of the second-layer switch and fourth-layer switch and the combination of the plurality of serially-connected service-providing devices. Moreover, through the integration of various network processing devices, such as in a Bridge, Proxy or Mirror pattern, the whole system may have both flow load balancing and a higher fault-tolerance mechanism when providing network services.

In another embodiment, a system for guiding and distributing network load flow of the present invention further comprises an inter-switch. The inter-switch connects the routing device to at least two sets of service-providing devices configured in a parallel manner or in a cluster manner.

Figure 4:
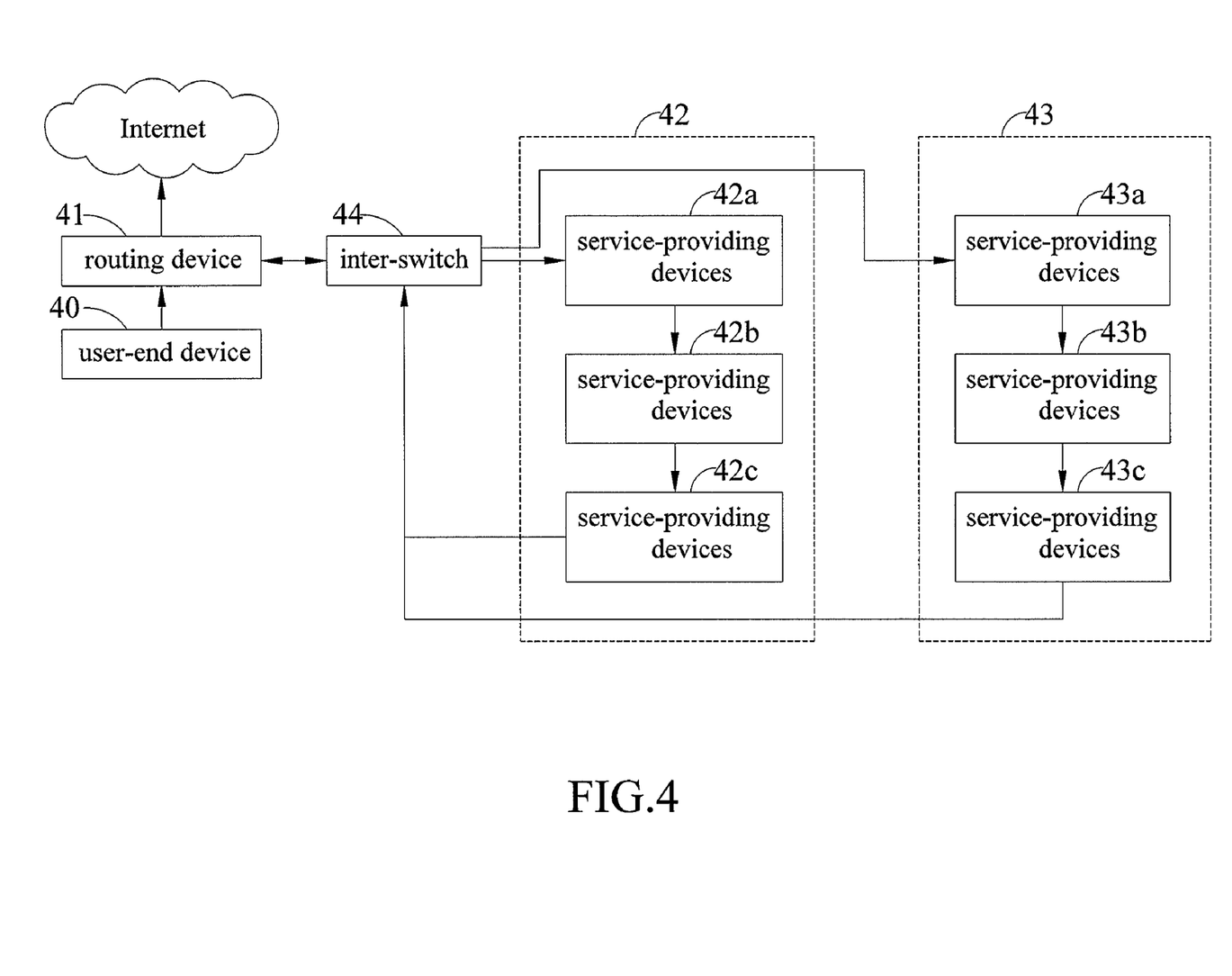
FIG. 4 is a functional block diagram of a system for guiding and distributing network load flow in a parallel manner or in a cluster manner according to the present invention.

FIG. 4 is a functional block diagram of a system for guiding and distributing network load flow in a parallel manner or in a cluster manner according to the present invention. Because service providers may provide various network services, processing with only one set of service-providing devices may result in too low of a processing speed. Therefore, a plurality of sets of service-providing devices may be connected in a parallel manner or in a cluster manner. As shown in the figure, when the user-end device 40 transmits packets to the routing device 41, and after the routing device 41 analyzes the packets and ascertains the network services utilized by a user, the packets are transmitted, via a transfer function provided by an inter-switch 44, to corresponding service-providing equipment 42 or service-providing equipment 43. Note that the service-providing equipment 42 comprises service-providing devices 42a-42c, and the service-providing equipment 43 comprises service-providing devices 43a-43c, wherein each of the service-providing devices 42a-42c and 43a-43c may handle the same network service content or different network service content. The inter-switch 44 provides packet transmission between the service-providing devices 42 and 43. Therefore, transmission bottlenecks due to the interconnection of network equipment may be avoided. In an embodiment of the present invention, the inter-switch 44 may be realized by the Ether Channel technique provided by Cisco.

As described previously, the service-providing devices may be connected in a parallel manner or in a cluster manner, which allows Internet service providers, when providing new network services, to establish service-providing devices in a simple way. If too many network services need to be processed, a single set of service-providing devices may have bad processing effects. Another set of service-providing devices may be added to distribute data processing load, so as to promote service speed and quality. Note that neither the service-providing equipment 42 and 43 shown in FIG. 4 limit the number of service-providing devices or the service content handled therein.

The present invention also provides a method for guiding and distributing network load flow, which details transmission routes and directions of user-end packets, so as to achieve the objective of network load flow guidance and distribution.

Figure 5:
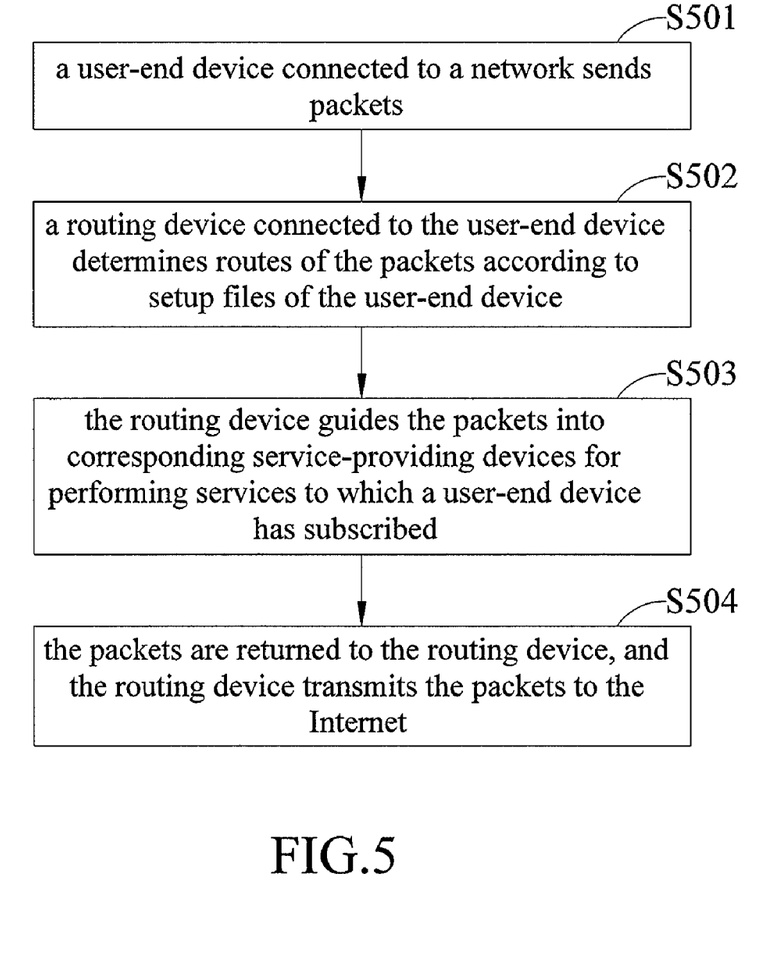
FIG. 5 is a flowchart of a method for guiding and distributing network load flow according to the present invention.

FIG. 5 is a flowchart of a method for guiding and distributing network load flow according to the present invention. As shown in the figure, the method comprises the following steps. In step S501, a user-end device connected to a network sends packets. Then proceed to step S502. In step 502, a routing device connected to the user-end device determines routes of the packets according to setup files of the user-end device. That is, the routing device, when receiving packets transmitted by the user-end, may determine whether the user has subscribed to corresponding value-added services according to the setup files, and determine the route guidance of the packets. Then proceed to step S503. In step S503, the routing device guides the packets into corresponding service-providing devices, for providing services to which the user-end device has subscribed. Then proceed to step S504. In step S504, the packets are returned to the routing device, and the routing device transmits the packets to the Internet. That is, after the subscribed for network services are processed completely, the packets are returned to the routing device first and then to the desired destination location (i.e., packet destination) on the Internet.

In step S502, the routing device transmits the packets to corresponding service-providing equipment according to the setup files, wherein each set of service-providing equipment comprises at least two service-providing devices for providing network services. The service-providing devices are serially connected, allowing the service-providing devices that provide services corresponding to the network services subscribed to by the user-end device to complete the subscribed to network services for the packets according to a serially-connected sequence of the at least two service-providing devices. Therefore, the flow load of the routing device in network service equipment of the prior art may be reduced.

As described previously, each of the sets of service-providing equipment may be comprised of at least two serially-connected service-providing devices. Moreover, when the number of the provided network services is increased, a plurality of sets of service-providing equipment may be configured in a parallel manner or in a cluster manner via an inter-switch in order to add new equipment conveniently or provide flow distribution to improve the efficiency. Therefore, packets may be transmitted among the sets of service-providing equipment.

In summary, the present invention provides a system and method for guiding and distributing network load flow. Compared with the prior art, providing a user-end device, when transmitting packets, with better flow guidance and distribution is realized by a routing device that determines whether the packets have to be passed on to service-providing devices, so as to avoid too heavy a load put on the service-providing devices or the routing device, and to reduce network delay due to too heavy a load. Also, the sets of service-providing equipment connected in a parallel manner or in a cluster manner provide a flow-distribution effect. Moreover, the present invention, when applied to different types of network service equipment, needs only one routing device to collect various flows first and then distribute the flows, so as to reduce the complexity of establishing a plurality of network devices having the same structure or setting. Therefore, through the system structure and method of the present invention, users may be provided with more elastic network services, and the setting complexity of flow guidance and network delay may be reduced, and operation cost may also be reduced, which greatly contributes to network service development.

The foregoing descriptions of the detailed embodiments are illustrated to disclose the features and functions of the present invention and not intended to be restrictive of the scope of the present invention. It should be understood by those in the art that many modifications and variations can be effected according to the spirit and principles in the disclosure of the present invention and yet still fall within the scope of the appended claims.

What is claimed is:

1. A system for guiding and distributing network load flow, said system comprising:
   a user-end device;
   a routing device, for providing the user-end device with network connection routes; and
   a single service-providing equipment connected serially to at least a first service-providing device and a second service-providing device wherein the first service-providing device is connected in parallel to a first processing device providing a first service and to a second processing device providing the same first service wherein the second service-providing device is connected in parallel to a third processing device providing a second service and to a fourth processing device providing the same second service, wherein the first service and the second service are different services, enabling the single service-providing equipment belonging to a route set up by the routing device to provide user-subscribed-for or utilized services according to a serially-connected sequence of at least the first service-providing device and the second service-providing device.

2. The system of claim 1, wherein the routing device comprises setup files as a transmission basis for packets transmitted from the user end device.

3. The system of claim 2, wherein the routing device determines transmission routes of the packets transmitted from the user-end device according to the setup files.

4. The system of claim 2, wherein the setup files comprise IP information and RADIUS authentication, authorization and accounting information of the user-end device and information about user-subscribed-for services.

5. The system of claim 2, wherein the routing device enables the packets of the user-end device to be transmitted to a corresponding service-providing device.

6. The system of claim 1, wherein at least the first service-providing device and the second service-providing device guides packets transmitted from the user-end device to the processing devices, for the processing devices to perform mail filtering, anti-virus, virus-scanning, abnormal packet checking and/or network page filtering services.

7. The system of claim 1, further comprising a second-layer switch and a fourth-layer switch, wherein the second-layer switch and/or the fourth-layer switch are connected to the single service-providing equipment for providing flow load balancing.

8. The system of claim 1, wherein at least the first service-providing device and the second service-providing device are connected to the processing devices for processing network load flow of proxy, bridge and/or mirror patterns guided by at least the first service-providing device and the second service-providing device.

9. The system of claim 1, wherein one of at least the first service-providing device and the second service-providing device is connected via a second-layer switch to the processing devices in a bridge pattern.

10. The system of claim 1, wherein one of at least the first service-providing device and the second service-providing device is connected via a second-layer switch to the processing devices in a mirror pattern.

11. The system of claim 1, wherein at least the first service-providing device and the second service-providing device are serially connected to at least a fourth-layer switch that is connected to the processing devices in a proxy pattern.

12. The system of claim 1, further comprising an inter-switch, wherein the single service-providing equipment is divided into at least two sets that are connected via the inter-switch to the routing device in a parallel manner or in a cluster manner.

13. A method for guiding and distributing network load flow, said method comprising the following steps of:
   (1) serially-connecting at least a first service-providing device and a second service-providing device wherein the first service-providing device is connected in parallel to a first processing device providing a first service and to a second processing device providing the same first service wherein the second service-providing device is connected in parallel to a third processing device providing a second service and to a fourth processing device providing the same second service, wherein the first service and the second service are different services;
   (2) enabling a user-end device connected to a network to transmit packets;
   (3) enabling a routing device connected to the user-end device to determine routes of the packets according to setup files of the user-end device;
   (4) enabling the routing device to guide the packets to at least the first service-providing device and the second service-providing device according to the routes, enabling a single service-providing equipment that provides the user-end device with user-subscribed-for services to complete the user-subscribed-for services for the packets according to serially-connected sequence of at least the first service-providing device and the second service-providing device; and (5) enabling the packets to return to the routing device, for the routing device to transmit the packets onward to the Internet.

14. The method of claim 13, wherein the setup files include information about the user-subscribed-for services in order for the packets to be guided to at least the first service-providing device and the second service-providing device that provide services corresponding to the user-subscribed-for services of the user-end device.

15. The method of claim 13, wherein at least the first service-providing device and the second service-providing device are distributed across a plurality of sets, each of the sets connected to the routing device in a parallel manner or in a cluster manner.

16. The method of claim 13, wherein, in step (1), one of at least the first service-providing device and the second service-providing device is connected via a second-layer switch to the processing devices in a bridge pattern, such that, in step (4), at least the first service-providing device and the second service-providing device, after the packets are guided to at least the first service-providing device and the second service-providing device connected to the processing devices, guide the packets to one of the processing devices according to flow load balancing.

17. The method of claim 13, wherein, in step (1), one of at least the first service-providing device and the second service-providing device is connected to the processing devices in a mirror pattern, such that, in step (4), at least the first service-providing device and the second service-providing device, after the packets are guided to at least the first service-providing device and the second service-providing device connected to the processing devices, guide the packets to one of the processing devices according to a flow load balancing mechanism and/or a fault-tolerance mechanism.

18. The method of claim 13, wherein, in step (1), at least the first service-providing device and the second service-providing device are serially connected to at least a fourth-layer switch that is connected to the processing devices in a proxy pattern, such that, in step (4), the at least a fourth-layer switch determines whether to guide the packets to one of the processing devices according to a flow load balancing mechanism and/or a fault-tolerance mechanism.

* * * * *